Feb. 23, 1971 K. P. LALLY 3,566,391
MULTILAYER ELECTROLUMINESCENT DISPLAY APPARATUS HAVING
MULTIPLE, SELECTIVELY ENERGIZABLE ELECTRODE
ELEMENTS FORMING COMPOSITE ELECTRODES
OF PREDETERMINED CONFIGURATION
Filed Sept. 6, 1968 7 Sheets-Sheet 1
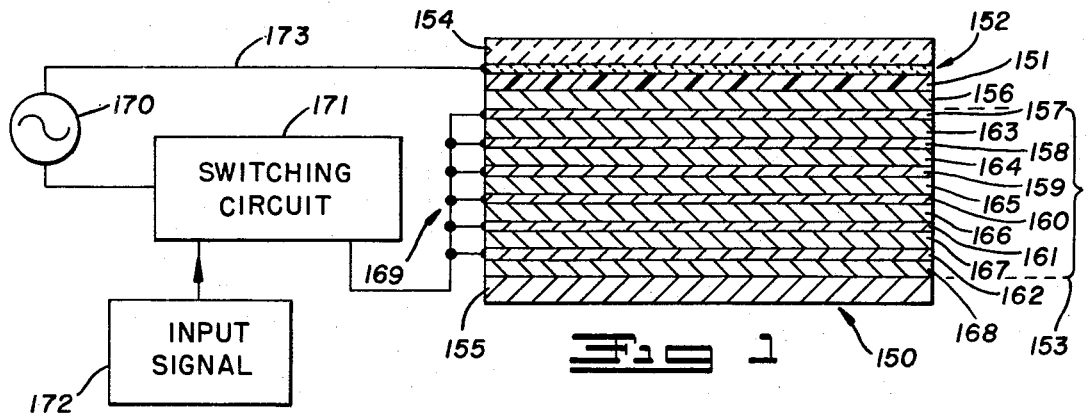
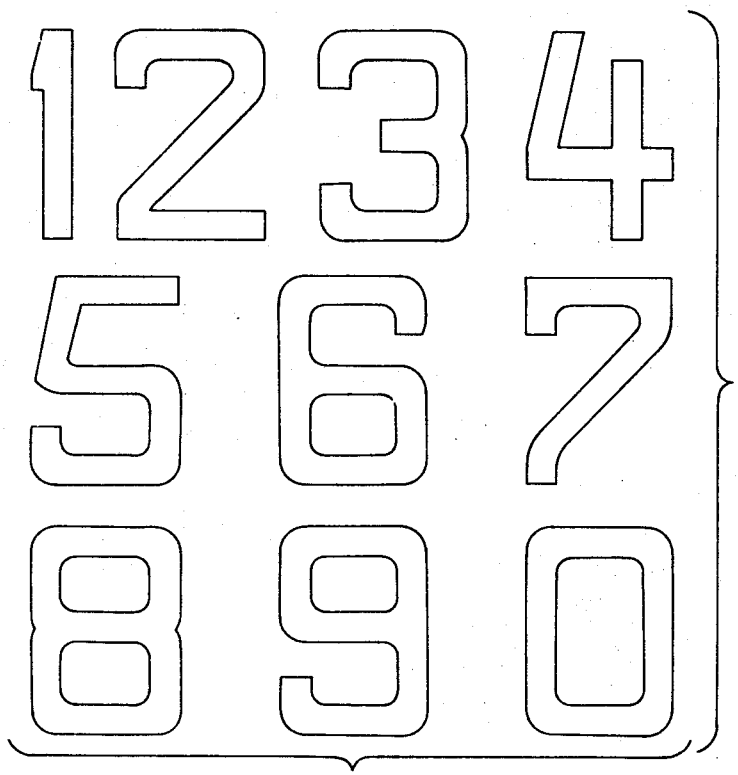
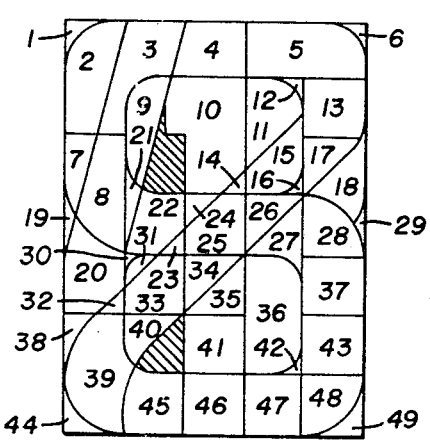
INVENTOR.
KENNETH P. LALLY
BY
MAHONEY, MILLER & RAMBO
BY
ATTORNEYS

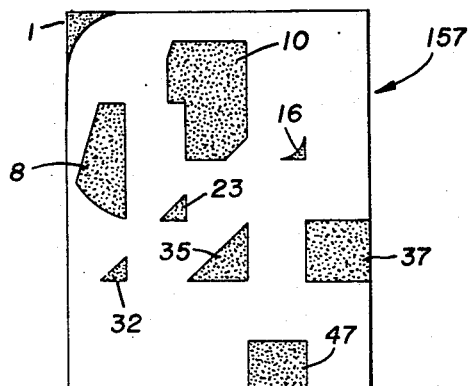
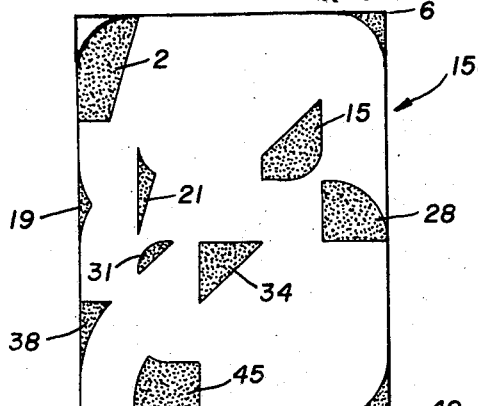
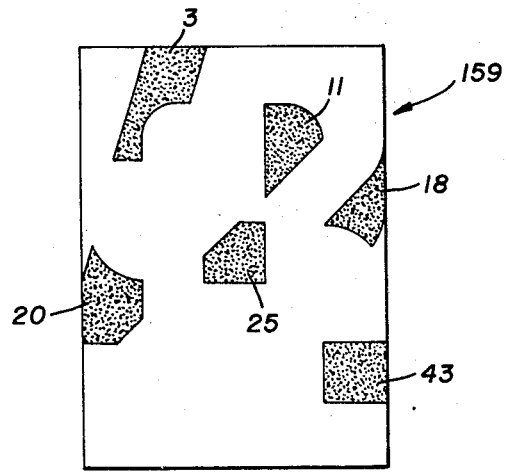
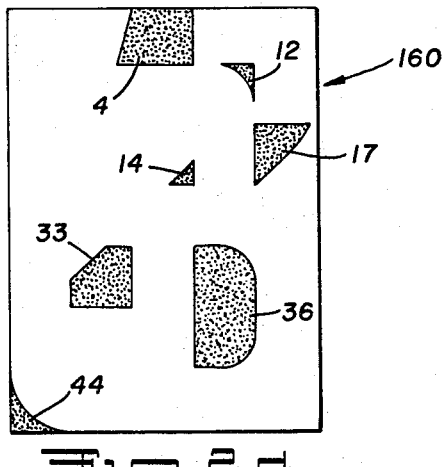
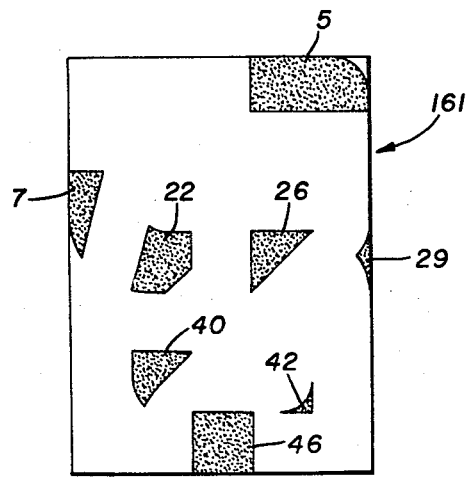
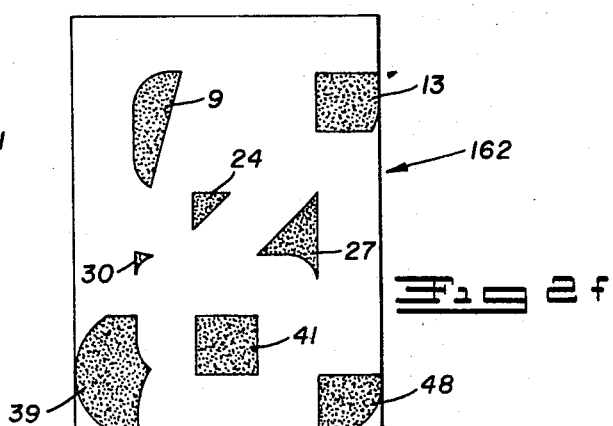

Feb. 23, 1971 K. P. LALLY 3,566,391
MULTILAYER ELECTROLUMINESCENT DISPLAY APPARATUS HAVING
MULTIPLE, SELECTIVELY ENERGIZABLE ELECTRODE
ELEMENTS FORMING COMPOSITE ELECTRODES
OF PREDETERMINED CONFIGURATION
Filed Sept. 6, 1968 7 Sheets-Sheet 3
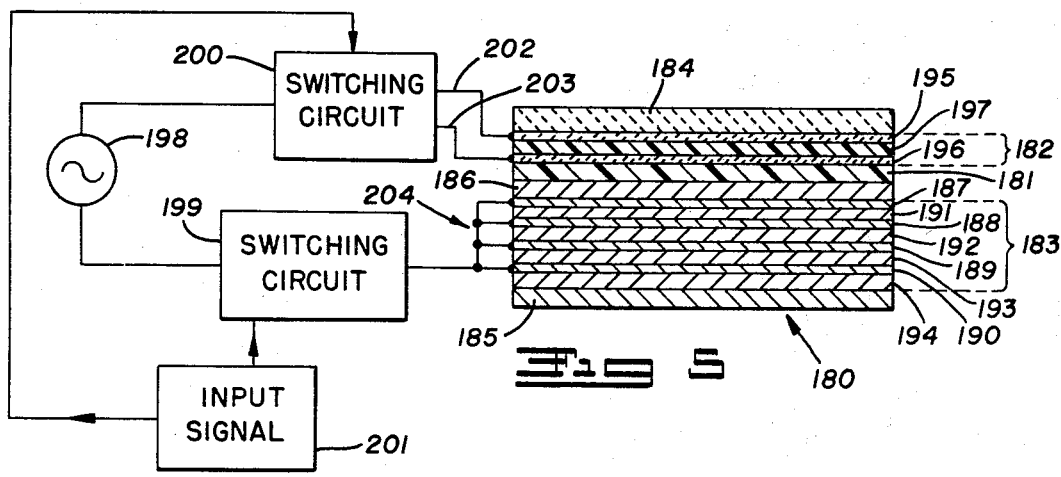
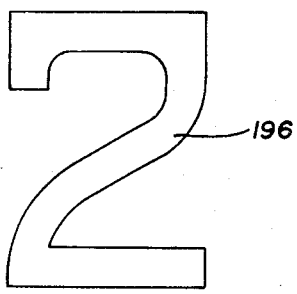
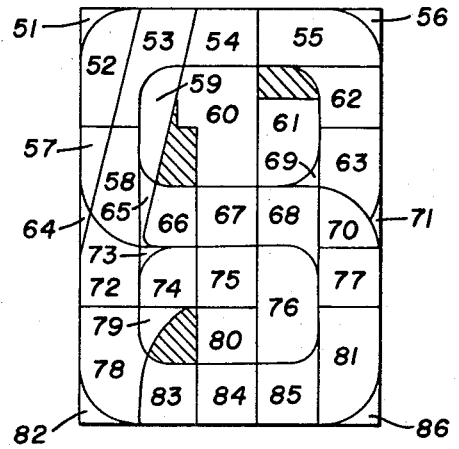
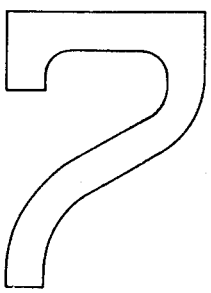
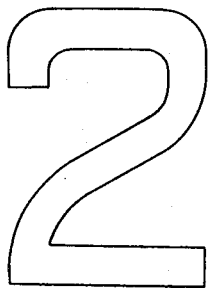
INVENTOR.
KENNETH P. LALLY
BY
MAHONEY, MILLER & RAMBO
BY *Wm. V. Miller*
ATTORNEYS Feb. 23, 1971         K. P. LALLY         3,566,391
MULTILAYER ELECTROLUMINESCENT DISPLAY APPARATUS HAVING
MULTIPLE, SELECTIVELY ENERGIZABLE ELECTRODE
ELEMENTS FORMING COMPOSITE ELECTRODES
OF PREDETERMINED CONFIGURATION
Filed Sept. 6, 1968                 7 Sheets-Sheet 4

INVENTOR.
KENNETH P. LALLY
BY
MAHONEY, MILLER & RAMBO
BY
ATTORNEYS

Feb. 23, 1971 K. P. LALLY 3,566,391
MULTILAYER ELECTROLUMINESCENT DISPLAY APPARATUS HAVING
MULTIPLE, SELECTIVELY ENERGIZABLE ELECTRODE
ELEMENTS FORMING COMPOSITE ELECTRODES
OF PREDETERMINED CONFIGURATION
Filed Sept. 6, 1968 7 Sheets-Sheet 5

INVENTOR.
KENNETH P. LALLY
BY
MAHONEY, MILLER & RAMBO
BY
ATTORNEYS

Feb. 23, 1971 K. P. LALLY 3,566,391
MULTILAYER ELECTROLUMINESCENT DISPLAY APPARATUS HAVING
MULTIPLE, SELECTIVELY ENERGIZABLE ELECTRODE
ELEMENTS FORMING COMPOSITE ELECTRODES
OF PREDETERMINED CONFIGURATION
Filed Sept. 6, 1968 7 Sheets-Sheet 6

INVENTOR.
KENNETH P. LALLY
BY
MAHONEY, MILLER & RAMBO
BY
ATTORNEYS

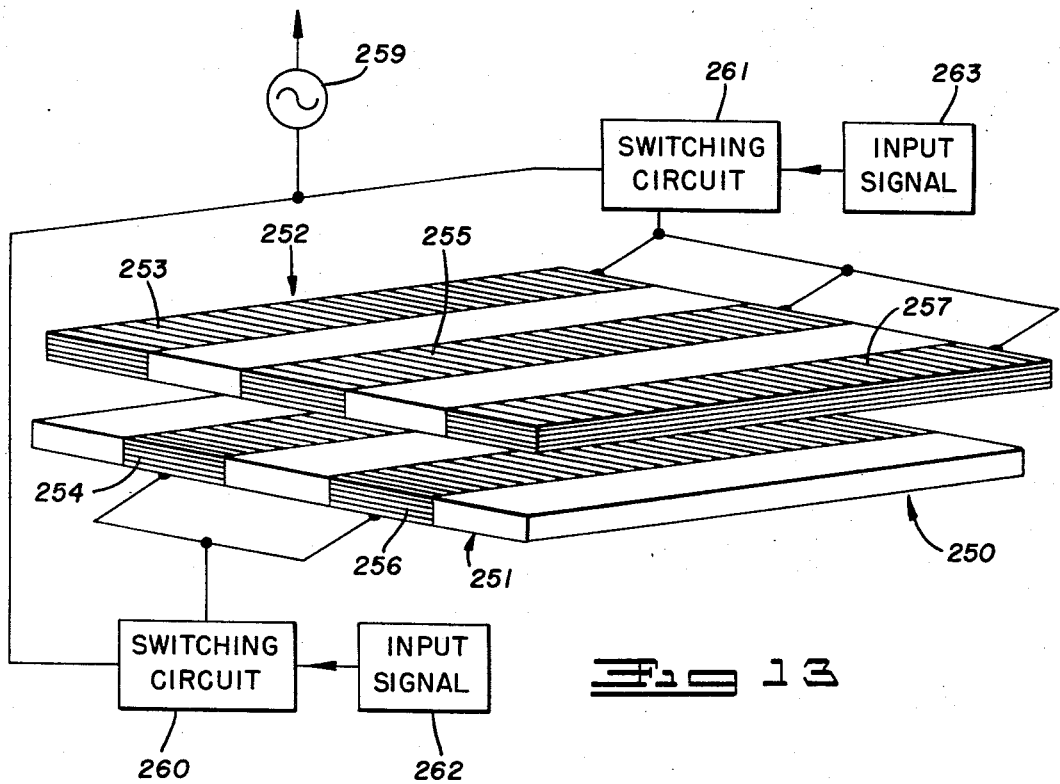

United States Patent Office 3,566,391
Patented Feb. 23, 1971

3,566,391
MULTILAYER ELECTROLUMINESCENT DISPLAY APPARATUS HAVING MULTIPLE, SELECTIVELY ENERGIZABLE ELECTRODE ELEMENTS FORMING COMPOSITE ELECTRODES OF PREDETERMINED CONFIGURATION
Kenneth P. Lally, Bayville, N.Y., assignor, by mesne assignments, to Hartman Systems Co., Inc., Huntington Station, N.Y., a corporation of Ohio
Filed Sept. 6, 1968, Ser. No. 757,933
Int. Cl. G08b 5/36
U.S. Cl. 340—336
11 Claims

ABSTRACT OF THE DISCLOSURE

Electroluminescent display devices, such as the alphanumeric type, are formed with a plurality of electrode members seperated by a dielectric material arranged in superposed relationship adjacent the surface of at least one side of an electroluminescent member with each electrode member comprising a plurality of discrete electrode elements. The electrode elements in the several electrode members are configured and relatively arranged to form selective composite patterns from one or more electrode elements selected from each of two or more electrode members which, when energized by application of an electric potential to the selected electrode elements, causes an area of the electroluminescent member to luminesce in accordance with the superposed composite electrode pattern.

GENERAL DESCRIPTION OF ELECTROLUMINESCENT DISPLAY APPARATUS

Electroluminescent display devices of a basic form comprise a mass of electroluminescent material interposed between a pair of electrodes which, when connected to a suitable source of electrical power, form an electric field between the electrodes. The electroluminescent material, which may be phosphor particles dispersed in a suitable dielectric material, is activated by the electric field and results in luminescence of the phosphor particles. At least one of the electrodes is formed to be light-transmissive and thus permit visual observation of the light emitted by the electroluminescent material as it luminesces. In the usual construction, the light-transmissive electrode is formed by depositing a thin film of electrically-conducting material on a light-transmissive substrate, such as glass or ceramic material, which provides structural strength for the device with the electrode being positioned in intimate proximity to a surface of the electroluminescent material. The other electrode may also be of light-transmissive construction and fabricated in a similar manner with the electrode also being positioned in proximity to the opposite surface of the mass of electroluminescent material. Application of an electric potential across the two electrodes will thus form an electric field which will activate the mass of electroluminescent material when the applied potential is of a frequency and amplitude to supply the necessary energy for luminescence of the phosphors.

In a basic form of electroluminescent display device, as previously described, the area of luminescence will be determined by the configuration or area of the electrodes having electroluminescent material interposed between opposed surface portions of the electrodes. Thus, for a basic form of the device in which the two electrodes are of planar sheet form and substantially of the same area and configuration, the area of luminescence will approximate the configuration of the electrodes and may be utilized to provide a panel-type illumination source. In order for an electroluminescent display device to provide information in useful form, such as an alpha-numeric display, at least one of the electrodes would be formed in a specific pattern having the configuration of the indicia which it is desired to display and result in luminescence of only the underlying volume of electroluminescent material to form a luminous display of that indicia. Since the structure of the device may not be readily altered, such as by replacing or interchanging the indicia-forming electrode, such a basic device is limited to ON-OFF type display of the single indicia. Multiple indicia displays utilizing the basic structure requires the several indicia-forming electrodes to be provided at one side of the mass of electroluminescent material and the provision of a suitable switching circuit for connection of a selected indicia-forming electrode to the source of electrical power. These multiple electrodes, in such a basic structure, must be of a configuration and relative arrangement so as not to be overlapping since the presence of a non-energized electrode in the projected path of a second electrode relative to the mass of electroluminescent material will form an electric shield and either cancel or distort the area or region of luminescence. Although such a basic structure has found application in conventional alpha-numeric displays, the usefulness of such a structure has been substantially limited due to the physical size of the apparatus required for a wide range alpha-numeric display. The physical size is limited to a relatively large dimension due to the fact that for a specific number of indicia, the indicia must be laterally separated to comply with the nonoverlapping criteria for avoiding distortion of adjacent indicia.

The electroluminescent display devices of this invention overcome the previously described disadvantage of the basic prior art structures through the utilization of a multilayered electrode structure disposed at one side of the mass of electroluminescent material or the construction of multilayered electrode structures at both sides of the electroluminescent material. In such a multilayered electrode structure, an electrode, which may include a specific area or region, is divided into relatively small elements or areas with the several elements of the electrodes being electrically discrete and thus permitting selective activation of particular electrodes. The specific electrode element configuration and arrangement is chosen to permit selection of one of several composite patterns through the appropriate energization of selected electrode elements in the several electrode layers. With this type of construction, a specific area of the surface of the display device may be utilized to display selectively any of the several indicia for which the electrode structure may be designed to portray. A further advantage of the display device structure of this invention is that only one layer of electroluminescent material is required to provide the necessary display. This factor permits the structure to be formed with a minimal depth dimension which furthers the compactness of construction.

Although specifically illustrated embodiments of the present display device are directed to numeric displays, practice of the invention is not limited to such displays but may be advantageously applied to alphabetical displays or other indicia displays through appropriate configuration and arrangement of the several electrode elements in the several electrode layers. A further advantage of the device is that the configuration of the numerals or alphabetic indicia may be constructed for optimum viewing and interpretation.

These and other objects and advantages of the present invention will be readily apparent from the following detailed description of the several embodiments thereof and the accompanying drawings.

In the drawings:
FIG. 1 is a diagrammatic view of an electroluminescent display device embodying this invention connected in an electric circuit with the device shown in sectional elevation.

FIGS. 2a-f are plan views of the several electrode members of the device shown in FIG. 1 showing the electrode element configuration and arrangement.

FIG. 3 is a composite plan view of the electrode elements of the several electrode members supported in assembled relationship as in FIG. 1.

FIG. 4 illustrates the numeric displays which may be formed by energization of selected electrode elements of the device of FIG. 1.

FIG. 5 is ia diagrammatic view of a modified form of the electroluminescent display device of this invention connected in an electric circuit with the device shown in sectional elevation.

FIG. 6 is a plan view of an electrode member of the device shown in FIG. 5.

FIGS. 7a-d are plan views of several electrode members of the device shown in FIG. 5 showing the electrode element configuration and arrangement.

FIG. 8 is a composite plan view of the electrode elements of the electrode members of FIGS. 7a-d supported in assembled relationship as in FIG. 5.

FIGS. 9 and 10 illustrate the modified configuration of the numerals 2 and 7 which may be formed by energization of selected electrode elements of the device of FIG. 5.

FIGS. 11a-e are plan views of several electrode members with a further modification of the electrode element configuration and arrangement for a numeric display and which electrode members may be incorporated in an electroluminescent device such as is shown in FIG. 1.

FIGS. 12a-g illustrate the numeric displays which may be formed by energization of selected electrode elements of the electrode members shown in FIGS. 11a-e.

FIG. 13 is a diagrammatic perspective view of a multilayer electrode structure for an electroluminescent device in which the electrode elements are spaced parallel, elongated bars.

Figure 7A:
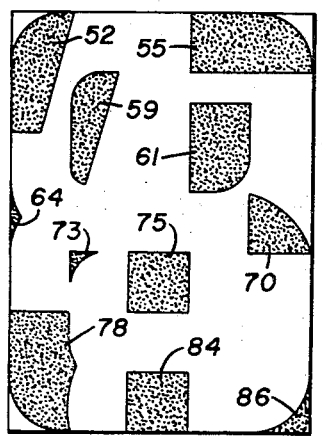
Figure 7B:
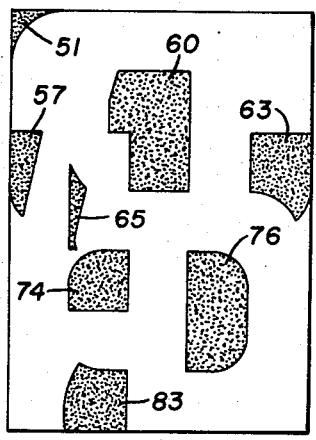
Figure 7C:
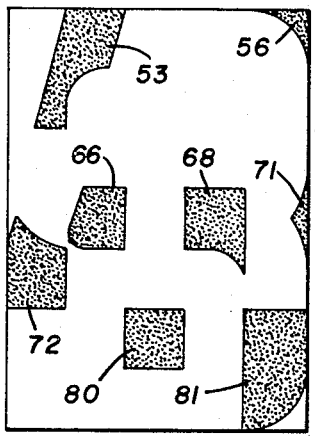
Figure 7D:
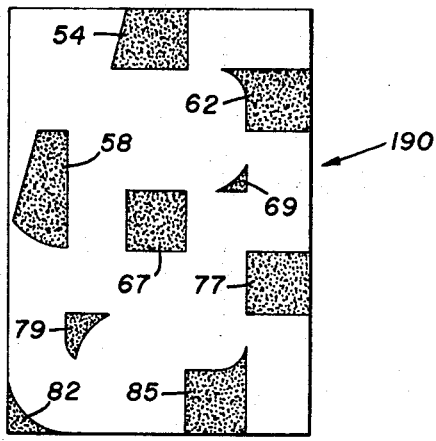
Figure 11A:
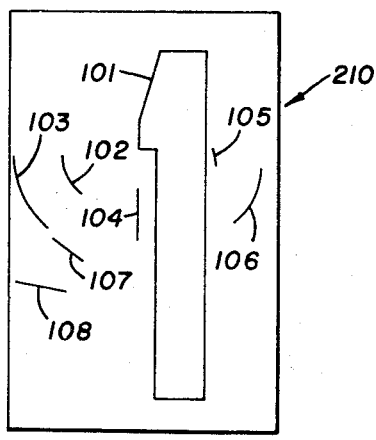
Figure 11B:
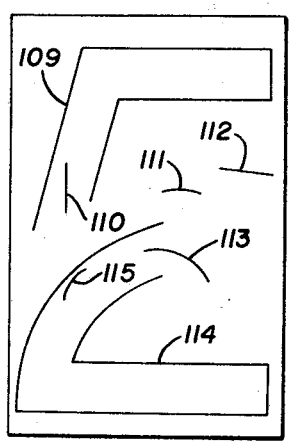
Figure 11C:
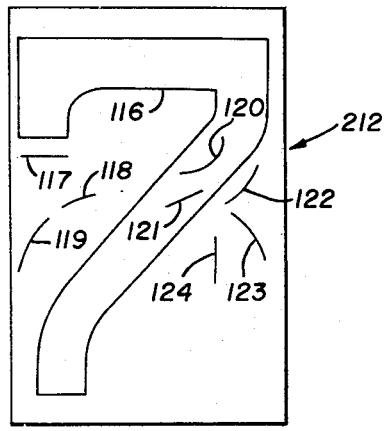
Figure 12A:
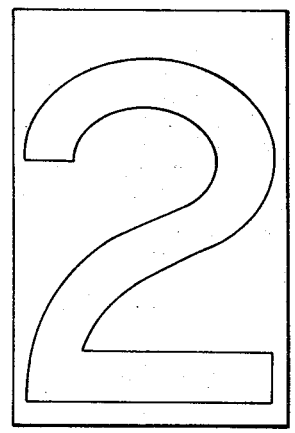
Figure 11D:
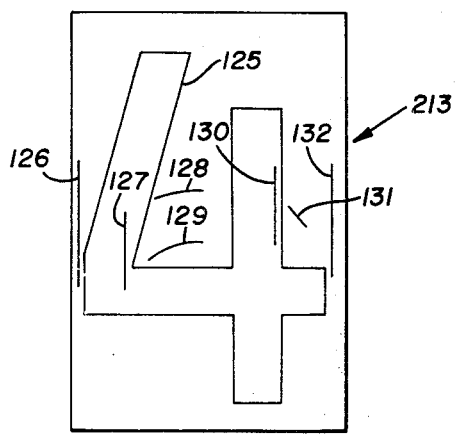
Figure 12B:
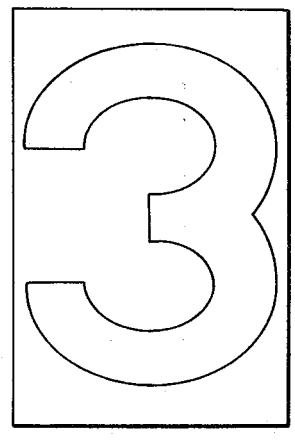
Figure 11E:
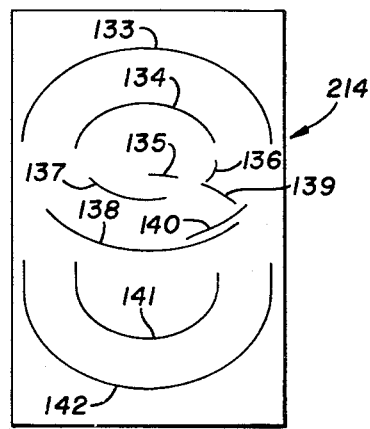
Figure 12C:
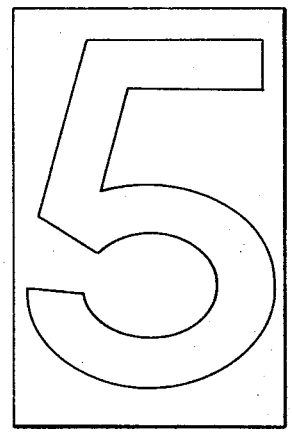
Figure 12D:
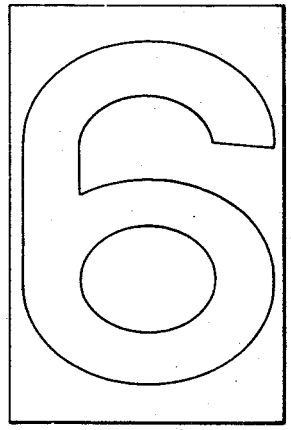
Figure 12F:
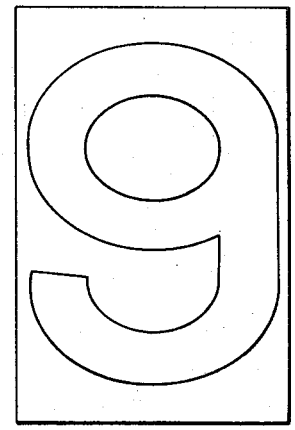
Figure 12E:
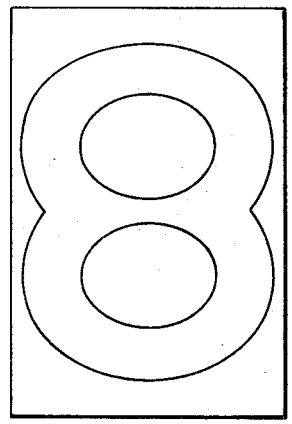
Figure 12G:
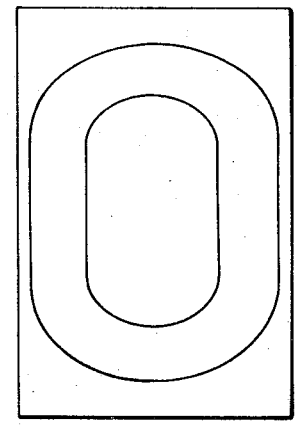
Figure 14:
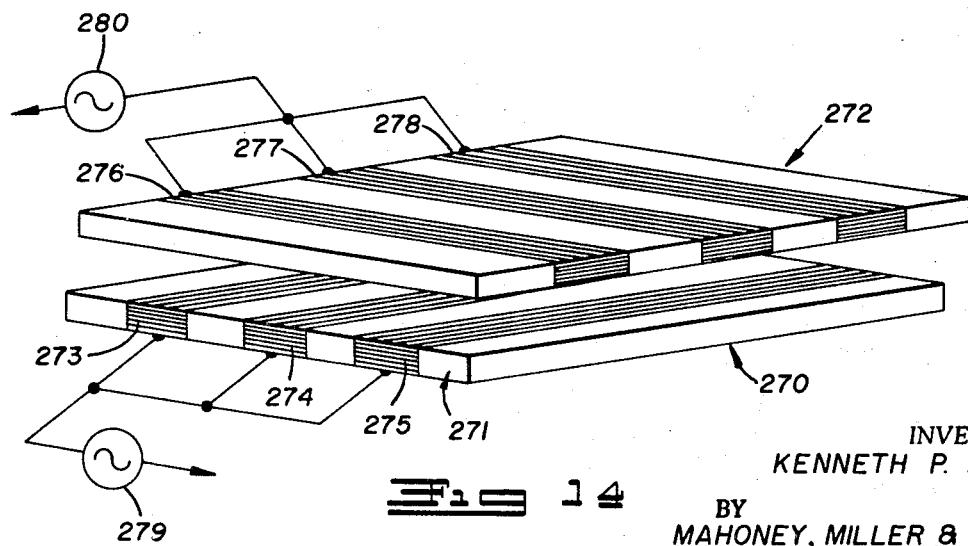

FIG. 14 is a diagrammatic perspective view of a multilayer electrode structure for an electroluminescent device in which the electrode elements are spaced parallel, elongated bars with the two layers assembled in orthogonal relationship and driven by independent power sources.

A first form of an electroluminescent display device embodying this invention is illustrated in FIGS, 1, 2, 3, and 4. Referring specifically to FIG. 1, the display device, indicated generally at 150, is seen to comprise a mass of electroluminescent material 151 with superposed first and second electrode means 152 and 153. The electrode means 152 and 153, which may be of planar sheet form as is the mass of electroluminescent material 151, are disposed on opposite sides of the electroluminescent material and will thus form the electric field when energized for activation of the electroluminescent material. Structural integrity for the device may be provided by front and rear substrates 154 and 155, which may be of sheet form and fabricated from a suitable glass, plastic, ceramic or other material. In the illustrated embodiment, the surface formed by the substrate 154 is considered as the viewing surface and the material utilized must, therefore, be light-transmissive. For the same reason, the first electrode 152 must also be light-transmissive and may be formed by vapor deposition of a suitable electrically-conducting material on a surface of the substrate 154. For the purpose of illustrating a numeric display device, it is assumed that the device 150 is formed with a rectangularly-shaped surface area defining the viewing surface. FIG. 1 is a sectional elevational view through the device to illustrate the several layers of the structure. Since the light emitted by the mass of electroluminescent material must be seen to form a useful display device, it will be understood that the electroluminescent phosphor particles are embedded in a light-transmissive dielectric which will permit the light emitted by the activated particles to be seen at the surface of the substrate 154. The specific materials utilized for the electroluminescent member or the light-transmissive electrode 152 as well as the fabrication techniques are well known and will not be further described herein as they do not form a part of the invention.

In addition to the electrode means 152 and 153 and the electroluminescent material 151, the display device 150 may be constructed to incorporate an additional sheet-form member 156 formed from a non-linear, resistive material. Such a non-linear, resistive member 156 is interposed between an electrode and the electroluminescent material to enhance the contrast between the activated and non-activated regions or areas of the mass of electroluminescent material as taught by the prior art disclosures.

The second electrode means 153 of the illustrated embodiment of FIG. 1 is formed with six electrode members, 157-162, which are arranged in superposed relationship. Each of the electrode members 157-162 is separated by a respective one of the dielectric members 163-167. Each of the dielectric members 163-167 is also of sheet form and is preferably coextensive with the adjacent electrode members and is designed to substantially prevent electric current conduction between any two electrode members 157-162. An additional dielectric member 168 may also be incorporated in the structure and interposed between the rearmost electrode member 162 and the rear substrate 155.

In accordance with this invention, the electrode members 157-162 are formed from discontiguous sheet-form elements of electrically conductive material with each electrode member comprising a plurality of electrically discrete electrode elements, as can be best seen in FIGS. 2a-f. These electrode elements are sequentially numbered 1 through 49 and may be formed by vapor deposition of suitable electrically-conductive materials in the form of thin films placed on a suitable substrate. In the illustrated embodiment, the respective dielectric members 163-168 form the substrates on which the electrode elements may be deposited. Each of the electrode elements 1 through 49, as shown in FIGS. 2a-f, is adapted to be connected with an electrical conductor (not shown) for effecting connection of electrode elements to a suitable source of electrical power external to the display device 150. These electrode-connecting conductors are formed in a manner which will substantially prevent their forming an electric field relative to the first electrode 152 and causing the electroluminescent material to luminesce in areas and regions other than that determined by the specific selected electrode elements. An electrical connection to the several electrode elements of each of the electrode members 157-162 is diagrammatically shown in FIG. 1 by conductor means 169.

The specific configuration and relative arrangement of the several electrode elements 1-49, as shown in FIGS. 2a-2f, was determined from a consideration of the specific numeral characteristics which it was desired to display by this particular device. These numeral styles are illustrated in FIG. 4 and include the numerals 1-9 and 0 which are adaptive to a decimal-type counting system. This style of numeral has been found particularly advantageous in that it is very readable and is not readily misinterpreted through casual visual observance. Other styles or forms of numerals as well as alphabetic characters may be utilized in the construction of a display device such as is described and illustrated herein in conjunction with the numeric indicia indicator and the principles governing the configuration and arrangement of the several electrode elements will be seen to be equally applicable. The numerals illustrated in FIG. 4 are seen to be collectively approximating a rectangular area and the display device 150 is constructed to have an effective visual observing area at least equal to the area required for each of the several numerals. It will also be noted that two or more of the numerals have areas which are common. This is particularly apparent in connection with numerals, such as three, five, six, eight, nine, and zero. Accordingly, the total area of consideration, which will be within the outlined form as shown in FIG. 3, is divided into areas or regions which define the specific electrode elements. The entire area of the rectangular block shown in FIG. 3 is divided into the electrode elements 1–49 with only two areas or regions not being utilized as electrode elements and these areas are shown as cross hatched. After determining the particular configuration of the individual electrode elements, as shown in FIG. 3, several of the electrode elements are arranged in each of the specific electrode members 157–162 in an arrangement where each electrode element will be electrically separated from each other electrode element in a specific electrode member. Thus, each electrode element may be selectively connected to a source of electrical power for activation of only that portion or area of the mass of electroluminescent material 161 which underlies that specific electrode element. Since the several electrode elements in any particular electrode member 157–162 are electrically separated due to the physical configuration of the elements in the particular electrode members, there will be no need for insulating adjacent electrode elements as would be the case with a single layer electrode having the elements disposed in one plane as shown in FIG. 3 to prevent energization of adjacent electrode elements. An advantage of this is that there will not be a visible discontinuity between two selected electrode elements which are energized as would be the case where adjacent electrode elements must be separated by dielectric material. The relationship of electrode elements and electrode members for forming the desired numerical characters, as shown in FIG. 4, is set forth in Table I to facilitate the understanding of the selection of the electrode elements for connection to the electrical power source.

The circuitry for selective energization of the specific electrode elements 1–49, as shown in FIGS. 2a–2f, is diagrammatically shown in FIG. 1. This circuitry includes a power source 170 which may be of the alternating current type and provides a suitable output voltage to produce the desired electric field for activation of the electroluminescent phosphors when connected to the electrode means 152 and 153 by a conductor 173 and the conductor means 169. Interconnected between the power source 170 and the conductor means 169 connecting with each of the individual electrode elements 1–49, is an electronic switching circuit or apparatus 171. This switching circuit 171 is shown as being controlled in its switching function by an input signal apparatus 172. Thus, for a specific example, assuming that the input signal circuit 172 determines that the numeral 1 is to be displayed by the device 150, the switching circuit 171 will operate to connect the selected ones of the electrode elements 1–49 to the power source 170. These selected electrode elements are identified in the column beneath the numeral 1 as listed in Table I. Since the power source 170 is also connected to the first electrode means 152, there will be an electric field formed which is limited to a region as defined by the specific electrode elements listed in column 1 of Table I. Referring to FIG. 3, it will be seen that these selected electrode elements will define a composite area which forms the numeral 1. Consequently, application of a suitable electric potential across the electrode elements thus selected in the second electrode means 153 and the first electrode means 152 will form an electric field causing the electroluminescent material to luminesce within a space defined by this electric field and thus form the desired numeral. Appropriate selection of the electrode elements as determined from a consideration of Table I will enable the apparatus to form any of the desired numeric indicia as shown in FIG. 4.

A point which has been ignored heretofore in the construction of the display device 150 with multilayered electrode means, such as 153, is the inherent variance in spacing relative to the first electrode as between any one of the electrode members 157–162 and any other of these electrode members. The effect of this variance in spacing would be to reduce the strength of the electric field which may be produced for any specific applied voltage. This effect may be substantially eliminated by the application of a relatively greater potential to the successive electrode members 157–162 which are more remote from the electroluminescent material 151. A specific circuit arrangement to accomplish the necessary increase in applied potential with the increased spacing of the electrode members is not shown but will be readily understood. As an example, voltage dropping impedance

TABLE I

[Numeral-electrode tabulation for Figures 2a–f, 3 and 4]

| Figure: | Numeral | | | | | | | | | |
|---|---|---|---|---|---|---|---|---|---|---|
| | 1 | 2 | 3 | 4 | 5 | 6 | 7 | 8 | 9 | 0 |
| 2a | 10 | 16 | 16, 37 | 8, 16 | 8, 23 | 8, 23 | 1, 16 | 8, 16 | 8, 16 | 8, 32 |
| | 35 | 23 | 47 | 32, 35 | 37, 47 | 32, 37 | 23, 32 | 23, 32 | 23, 37 | 37, 47 |
| | | 32 | | 37, 47 | | 47 | | 37, 47 | 47 | |
| | | 47 | | | | | | | | |
| 2b | 34 | 2, 15 | 2, 28 | 15, 21 | 6, 21 | 2, 19 | 2, 6 | 2, 21 | 2, 21 | 2, 19 |
| | | 34, 45 | 38, 45 | 31, 34 | 28, 38 | 2, , 28 | 15, 34 | 28, 38 | 28, 38 | 28, 38 |
| | | 49 | | | 45 | 38, 45 | | 45 | 45 | 45 |
| 2c | 25 | 3, 25 | 3, 18 | 3, 11 | 3, 25 | 3, 20 | 3, 25 | 3, 18 | 3, 18 | 3, 18 |
| | | | 25, 43 | 20 | 43 | 25, 43 | | 20, 25 | 25, 43 | 20, 43 |
| | | | | | | | | 43 | | |
| 2d | 4 | 4, 12 | 4, 12 | 12, 33 | 4 | 4, 12 | 4, 12 | 4, 12 | 4, 12 | 4, 12 |
| | 14 | 14, 17 | 17 | 36 | | | 14, 17 | 17 | 17 | 17 |
| | | 33, 44 | | | | | 33, 44 | | | |
| 2e | 46 | 5, 26 | 5, 26 | 26, 42 | 5, 22 | 5, 7 | 5, 26 | 5, 7 | 5, 7 | 5, 7 |
| | | 40, 46 | 42, 46 | | 26, 42 | 22, 26 | 40 | 22, 26 | 22, 26 | 29, 42 |
| | | | | | 46 | 42, 46 | | 42, 46 | 29, 42 | 46 |
| | | | | | | | | | 46 | |
| 2f | 24 | 13 | 13, 24 | 9, 30 | 9, 24 | 13, 24 | 13, 39 | 13, 24 | 13, 24 | 13, 39 |
| | 41 | 39 | 27, 39 | 27 | 27, 39 | 27, 30 | | 27, 30 | 27, 39 | 48 |
| | | 48 | 48 | | 48 | 39, 48 | | 39, 48 | 48 | | may be incorporated in the respective circuits to each of the electrode members.

A modified form of electroluminescent display device is shown in FIGS. 5 through 10 with the display device being shown in sectional elevation in FIG. 5 and indicated generally at 180. This modified display device 180 includes the same basic elements as in the first form shown in FIG. 1 and comprises a mass of electroluminescent material 181 and first and second electrode means 182 and 183. These superposed elements are supported between front and rear substrates 184 and 185 with the front substrate 184 being formed of a light-transmissive material. A member 186 formed from a non-linear, resistive material may also be interposed in the structure between the electroluminescent member 181 and the electrode means 183. In this embodiment, the second electrode means 183 is formed with only four electrode members 187–190. Each of these four electrode members 187–190 is also separated by an interposed sheet of dielectric material 191–193 with an additional dielectric member 194 interposed between the rearmost electrode member 190 and the rear substrate 185. Each of the electrode members 187–190 comprises a plurality of electrode elements within the numbered sequence 51–86 as is shown in FIG. 8 and in the several diagrams of FIG. 7. Each electrode element is formed in a manner as previously described by vapor deposition of an electrically conductive material on a substrate which, in this instance, is the dielectric member 191–194, which is immediately adjacent that particular electrode member.

The first electrode means 182 is also of a multilayer construction and includes the two electrode members 195 and 196 which are separated by a dielectric member 197. Both of the electrode members 195 and 196 are also formed by vapor deposition of an electrically conductive material on a substrate such as the front substrate 184 or the dielectric member 197. These electrode members, in addition to the dielectric member 197, are also formed from a material which is at least light-transmissive as they are between the electroluminescent material 181 and the viewing surface formed by the substrate 184.

The several electrode elements 51–86 are formed substantially as described in conjunction with the first form of the invention with the cumulative area of the several electrode elements forming the composite rectangular diagram as shown in FIG. 8. The configurations of the specific electrode elements are determined in accordance with the previously stated criteria to form numerical characters of the specific style substantially as shown in FIG. 4 with the exceptions of the numerals 2 and 7. A distinguishing feature of the numerals two and seven is the diagonal portion required which further complicates and increases the number of electrode elements required to properly display the desired configuration. In this form, the number of electrode elements is substantially reduced through the inclusion of the additional electrode member 196 in the first electrode means and which is utilized to form the diagonal portions of these two numerals. When it is desired to display a numeral other than two or seven, both electrode members 195 and 196 are connected to a source of electrical power as are the selected electrode elements from the group 51–86 as may be required to form that specific numerical character. This electrode selection is tabulated in Table II in the same manner as Table I to illustrate the selection of electrode elements. Electrode member 195 comprises a planar sheet of electrically conductive material and of an area which is coextensive with the composite area of the electrode elements 51–86 in electrode members 187–190. Electrode member 196 is of the configuration shown in FIG. 6.

TABLE II
[Numeral-electrode tabulation for Figures 5, 6, 7a–d, and 8]

| Figure: | Numeral | | | | | | | | | |
|---|---|---|---|---|---|---|---|---|---|---|
| | 1 | 2 | 3 | 4 | 5 | 6 | 7 | 8 | 9 | 0 |
| 5 | 195 |  | 195 | 195 | 195 | 195 |  | 195 | 195 | 195 |
| 6 | 196 | 196 | 196 | 196 | 196 | 196 | 196 | 196 | 196 | 196 |
| 7a | 75, 84 | 52, 55 | 52, 55 | 59, 61 | 55, 59 | 52, 55 | 52, 55 | 52, 55 | 55, 57 | 55, 57 |
| | | 70, 73 | 70, 78 | 73, 75 | 70, 78 | 64, 70 | 74, 75 | 70, 73 | 70, 78 | 64, 70 |
| | | 75, 78 | 84 |  | 84 | 73, 78 | 78 | 78, 84 | 84 | 78, 84 |
| | | 84, 86 |  |  |  | 84 |  |  |  |  |
| 7b | 60 | 63, 74 | 63, 83 | 65, 74 | 65, 83 | 57, 65 | 51, 63 | 57, 63 | 57, 63 | 57, 63 |
| | | 76, 83 |  | 76 |  | 83 | 74, 76 | 65, 83 | 65, 83 | 83 |
| 7c | 80 | 53, 66 | 53, 68 | 53, 68 | 53, 56 | 53, 66 | 53, 56 | 53, 66 | 53, 66 | 53, 71 |
| | | 68, 72 | 81 | 72 | 66, 68 | 68, 72 | 66, 68 | 68, 72 | 68, 21 | 72, 81 |
| | | 81 |  |  | 81 | 81 | 72 | 81 | 81 |  |
| 7d | 54, 67 | 54, 62 | 54, 62 | 58, 69 | 54, 58 | 54, 58 | 54, 62 | 54, 58 | 54, 58 | 54, 58 |
| | | 69, 79 | 67, 69 | 77, 85 | 67, 77 | 62, 67 | 67, 69 | 62, 67 | 62, 67 | 62, 77 |
| | | 82, 85 | 77, 85 |  | 85 | 77, 85 | 79, 82 | 69, 77 | 69, 77 | 85 |
| | | | | | | | | 85 | 85 | |

If it is desired to display either the numeral two or seven, only the electrode member 196 will be connected to the source of electrical power and the appropriate electrode elements selected from the second electrode means 183 which are also connected to this source of electrical power and form an electric field across the electroluminescent material 181. A specific electric field strength is required to cause the electroluminescent material to luminesce and areas which are not within the superposed electrode element areas from both the first and second electrode means will not luminesce. Consequently, although some of the electrode element areas selected from the second electrode means will be seen to extend beyond the area of the electrode member 196, only that mass of electroluminescent material 181 interposed between coextensive areas of the superposed electrode elements 51–86 and electrode 196 will be caused to luminesce. This particular electrode arrangement substantially reduces the number of electrode elements required in the second electrode means and also permits the more advantageous shaping of the style of the numerical characters, such as two and seven.

The electrical circuit for activating the electroluminescent material 181 is diagrammatically illustrated in FIG. 5. This circuit includes a suitable source of electrical power 198, the switching circuits 199 and 200, and an input signal circuit 201. The switching circuit 200 controls connection of the power source 198 to the electrode members 195 and 196 through the electrical conductors 202 and 203 while the switching circuit 199 controls connection of the selected electrode elements of the second electrode means through the electrical conductor system indicated generally at 204. The input signal circuit 201 is connected to both switching circuits 199 and 200.

The embodiments of the invention described heretofore are of the type which are designed to present block-type numerical character displays. A further modified form of the invention is illustrated in FIGS. 11 and 12. In this form, the numerical characters comprise double-line representations of the specific characters. Here again, at least several of the characters are formed by composite arrangement of electrode elements which are distributed in several superposed electrode members. The number of electrode members, in this instance, comprises five such members 210–214 with the several electrode elements, 101 through 142, being formed by vapor deposition of an electrically-conductive material in line-form on a suitable dielectric substrate. These dielectric substrates are then assembled into a structure such as is indicated in FIG. 1 with the several electrode members forming an electrode means, such as the second electrode means. The assembly of the several electrode members 210 through 214 is not illustrated as the assembly will be readily understood from a consideration of the structure of FIG. 1. It will also be understood that the several electrode elements numbered 101 through 142 will be connected by a suitable electrically-conductive means (not shown) to an appropriate power source and switching circuit, such as is indicated in FIG. 1, with the switching circuit being modified to the extent to control the particular electrode element configuration and arrangement of this particular modification. This type of electrode arrangement and construction permits further freedom in the choice of the style of the numerical characters. Because of the specific style chosen to be illustrated, the numerals 1, 7 and 4 do not have line segments which are common to each other or any of the other electrode elements forming the remaining numerical characters are, therefore, formed in their entirety on respective ones of the electrode members. The remaining numerical characters, however, are formed from common electrode segments and these are illustrated in the diagrams of FIGS. 11a through 11e. The selection of electrodes for energization to produce the desired numerical character is tabulated in Table III which lists the electrode elements required for formation of the particular numerals. The numerals other than 1, 4 and 7 are shown in FIGS. 12a through 12g.

TABLE III

[Numeral-electrode tabulation for Figures 11a-e and 12a-g]

| | Numeral shown in Figure | | | | | | | | | |
|---|---|---|---|---|---|---|---|---|---|---|
| | 1 | 2 | 3 | 4 | 5 | 6 | 7 | 8 | 9 | 0 |
| | 11a | 12a | 12b | 11d | 12c | 12d | 11c | 12e | 12f | 12g |
| Figure: | | | | | | | | | | |
| 11a | 101 | 105 | 104 | | 107 | 105 | | 102 | | |
| | | 106 | 108 | | 108 | | | 103 | | |
| | | | | | | | | 105 | | |
| | | | | | | | | 106 | | |
| 11b | | 114 | 113 | | 109 | 110 | | 113 | | |
| | | | | | 111 | 111 | | 115 | | |
| | | | | | 113 | 112 | | | | |
| | | | | | | 113 | | | | |
| | | | | | | 115 | | | | |
| 11c | | 117 | 117 | | 123 | 118 | 116 | 119 | 124 | 123 |
| | | 120 | 122 | | | 123 | | 120 | | |
| | | 121 | 123 | | | | | 123 | | |
| 11d | | | 131 | 125 | 128 | 126 | | 129 | 132 | 124 |
| | | | | | 129 | 128 | | | | 126 |
| | | | | | 131 | 129 | | | | 137 |
| | | | | | | 131 | | | | 130 |
| 11e | | 133 | 133 | | 135 | 133 | | 133 | 133 | 132 |
| | | 134 | 134 | | 139 | 134 | | 134 | 134 | 134 |
| | | 136 | 135 | | 141 | 135 | | 136 | 137 | 141 |
| | | 140 | 141 | | 142 | 139 | | 137 | 138 | 142 |
| | | | 142 | | | 141 | | | 141 | |
| | | | | | | 142 | | | 142 | |

The application of a multilayer electroluminescent device, such as has been described hereinbefore, is not limited to the display of numerical or alphabetic characters and such multilayer devices may be constructed to display other indicia forming composite patterns for information portrayal. Such a further application of this invention is shown in FIG. 13. In this figure, only a second electrode means is shown but it is to be understood that such an electrode means will be utilized in conjunction with a mass of electroluminescent material and a first electrode means such as is shown in FIG. 1. This second electrode means, indicated generally at 250, comprises two electrode members 251 and 252 which are separated by a coextensive, sheet-form dielectric member (not shown for clarity of illustration). Each of the electrode members 251 and 252, as well as the dielectric member, may be of a planar configuration, such as is shown, or may be formed into other geometrical shapes. Each electrode member 251, 252 comprises a plurality of electrode elements which are numbered sequentially from 253 through 257 with each electrode element being of elongated bar-form disposed in spaced, parallel relationship to each other electrode element. The relative arrangement of the electrode elements is such that, in a particular electrode member, the electrode elements are spaced apart a distance equal to the width of the particular electrode elements. Viewing the electrode members as a composite unit, it will be seen that the electrode elements 253 through 257 form a continuous plane with the longitudinal edges of an electrode element in one electrode member 251 or 252 being contiguous with the longitudinal edges of the adjacent electrode elements in the other electrode member. Each of the electrode elements 253 through 257 will be selectively connectable to a suitable electric power source 259 through the respective switching circuits 260 and 261 which are associated with the respective electrode members 251 and 252. Input signal circuits 262 and 263 are provided for the respective switching circuits 260 and 261 to control the operation of these circuits. The operation of this form of the display device is such that the electrode elements 253 through 257 will be sequentially connected to the power source 259 to form a cumulatively enlarging area of coverage to increase the display area of the electroluminescent material which will be caused to luminesce through the electric field produced by the respective energized electrode elements and the electrode means disposed at the opposite side of the mass of electroluminescent material. One readily apparent utilization of a display device incorporating a second electrode means such as that indicated at 250 and illustrated in FIG. 13 will be for an indicating instrument providing an analog display of a digital input. This analog display may be registered with a calibration means or chart to provide a digital readout.

A further modified form of the electroluminescent apparatus utilizing a multilayer electrode structure is shown in FIG. 14. In FIG. 14, only the second electrode means, indicated generally at 270, is shown in the same manner as is the second electrode means shown in FIG. 13. This second electrode means 270 comprises two electrode members 271 and 272 which are separated by a dielectric member (not shown). The second electrode means 270 will be supported at one side of a mass of electroluminescent material as is the second electrode means 153 shown in FIG. 1 and will cooperate with a first electrode means through an appropriate electrical power source and switching circuitry. Each of the electrode members 271 and 272 includes the several electrode elements 273 through 278, respectively, with the electrode elements in each member being separated by a dielectric material. The electrode elements 273 through 278 are shown as relatively broad bars of elongated form; however, the specific application to which this form is directed would utilize electrode elements which are of the line type, such as an electrically-conductive trace deposited on a suitable substrate. The two electrode members 271 and 272 are supported in orthogonal relationship or at some angle other than a parallel alignment as in the previously illustrated example of FIG. 13. A power source, 279 and 280, having a specific frequency and amplitude is connected to each of the electrode elements in a respective electrode member with each power source also being connected to a first electrode means disposed at the opposite side of the mass of electroluminescent material. Assuming that the power sources 279 and 280 are operating at the same frequency and in phase and are adjusted to provide an electric potential to the respective electrode elements of each electrode member 271 and 272 which is sufficient to produce luminescence, a grid-type pattern will be observed at the viewing surface of the electroluminescent display device. With the electrode elements 273 through 278 being of a relatively narrow width, there will be little interference in the crossed grid presentation. However, with the power sources 279 and 280 operating at different frequencies, F1 and F2, respectively, an interaction takes place between the applied electric fields which modulates the intensity of the images resulting from each field. This interaction may be visually observed if the frequencies F1 and F2 differ by a frequency which is less than the upper flicker perception limit of the eye. The images will be observed to alternately brighten and dim at a frequency which is a function of the difference between the frequencies F1 and F2.

As another mode of operation of the multilayer electroluminescent display device shown in FIG. 14, the amplitude of the potential applied by one of the power sources 279 or 280 may be adjusted to reduce the applied voltage or potential to the point where the resultant electric field will be insufficient to cause luminescence of the electroluminescent material and only one image will then be observed at the viewing surface of the display device. Although the electric field for this electrode member will be insufficient to produce luminescence, the electric field will interact with the electric field produced by the other electrode member and produce a beat modulation of the intensity of the other image. Through appropriate control of the frequency of one of the power sources, the difference frequency may be reduced to slow the beat modulation to fractions of a cycle per second to a point where it is virtually stationary. This form of the apparatus and mode of operation may be used for visually checking one frequency against a standard as in frequency monitors or in tuning circuits.

It will be readily apparent from the foregoing detailed description of the several embodiments of this invention that a multilayer electroluminescent display device constructed in accordance with the teachings of this invention forms an improved display device. The display indicia are not limited as to configuration but may be of the most advantageous style for a particular application. The display area is maintained at a minimum and is capable of selectively displaying any one of several indicia. Distributing the electrode elements in several superposed layers eliminates insulation problems as between adjacent electrode elements and forms a display from several electrode elements without interelectrode discontinuities.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:
1. An electroluminescent display apparatus comprising
   (A) a mass of electroluminescent-phosphor material formed with opposed surfaces and emitting radiant energy when coupled with a phosphor-exciting electric field,
   (B) electrode means disposed in superposed relationship to said mass of electroluminescent-phosphor material for forming a phosphor-exciting electric field coupled with said electroluminescent material through said opposed surfaces when connected to receive electrical energy from a power source, said electrode means being transmissive of radiant energy at one of said opposed surfaces and including
      (1) a first electrode array having at least two electrically discrete electrode elements of predetermined configuration, said two electrode elements complementary in forming a composite electrode configuration, and
      (2) a second electrode array disposed in superposed relationship to said first electrode array and coextensive with the composite electrode configuration formed by said electrode elements, and
   (C) means connecting said electrode means to receive electrical energy from said source for selective application of an electrical potential to said electrode elements to excite a selected portion of said mass of electroluminescent-phosphor material into emission of radiant energy in a predetermined characteristic configuration.

2. An electroluminescent display apparatus according to claim 1 wherein said first electrode array comprises at least two electrode members assembled in superposed relationship to each other and to an adjacent one of said surfaces of said mass of electroluminescent-phosphor material, each of said electrode members having at least one electrode element with said electrode elements relatively disposed so that an electrode element in one of said electrode members is complementary to at least one electrode element in at least one other of said electrode members.

3. An electroluminescent display apparatus according to claim 2 which includes a dielectric member interposed between each pair of adjacent electrode members.

4. An electroluminescent display apparatus according to claim 2 wherein said first and second electrode arrays are disposed adjacent opposite ones of said surfaces of said mass of electroluminescent-phosphor material.

5. An electroluminescent display apparatus according to claim 4 wherein said second electrode members assembled in superposed relationship to each other and to an adjacent one of said surfaces of said mass of electroluminescent-phosphor material with said first electrode member disposed most closely adjacent thereto, and a dielectric member interposed between said first and second electrode members, said first electrode member being coextensive with less than all of said electrode elements of said first electrode array.

6. An electroluminescent display apparatus according to claim 4 wherein said first and second electrode arrays are of a planar configuration with said electrode elements of said first electrode array disposed in the plane of respective ones of said electrode members.

7. An electroluminescent display apparatus according to claim 6 wherein said electrode elements of said first electrode array are of planar sheet-form having a predetermined area.

8. An electroluminescent display apparatus according to claim 6 wherein said electrode elements of said first electrode array are of elongated, line-form with said electrode elements being complementary in end-to-end relationship.

9. An electroluminescent display apparatus according to claim 4 wherein said electrode elements in said first electrode array are of an elongated, straight-line configuration with the electrode elements in one of said electrode members being angularly displaced in the plane of said member to the electrode elements in at least one other of said electrode members.

10. An electroluminescent display apparatus according to claim 9 wherein said electrode elements in each of said electrode members overlap each of said electrode elements in each other of said electrode members.

11. An electroluminescent display apparatus according to claim 10 wherein all of said electrode elements in each said electrode member are connected to a respective electrical power source having a time-varying, electrical potential waveform of a respective frequency.

References Cited
UNITED STATES PATENTS

| | | | |
|---|---|---|---|
| 2,958,009 | 10/1960 | Bowerman | 315—169 |
| 3,280,341 | 10/1966 | Du Vall. | |
| 3,289,198 | 11/1966 | Dickson et al. | 340—336X |
| 3,356,899 | 12/1967 | Stone | 313—108X |
| 3,376,454 | 4/1968 | Stone | 313—108X |

THOMAS B. HABECKER, Primary Examiner

D. L. TRAFTON, Assistant Examiner

U.S. Cl. X.R.

313—108; 315—169; 340—324, 166